United States Patent Office 2,810,776
Patented Oct. 22, 1957

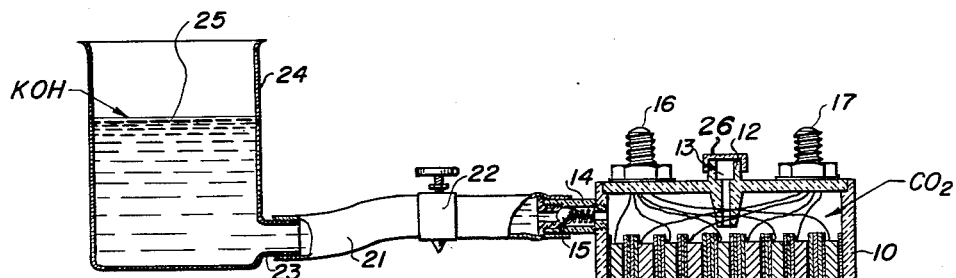
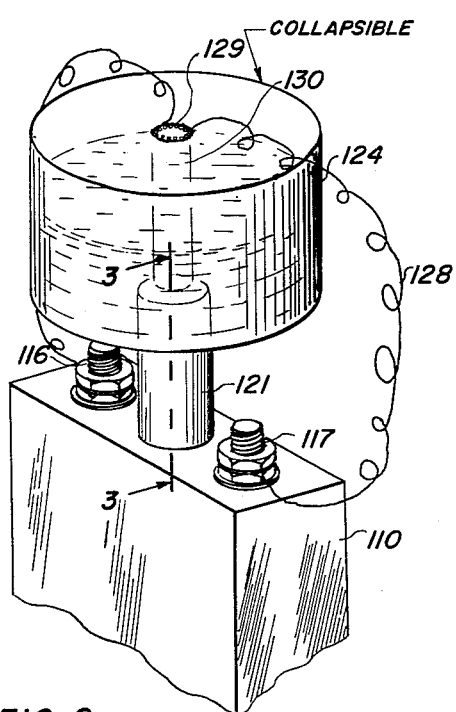
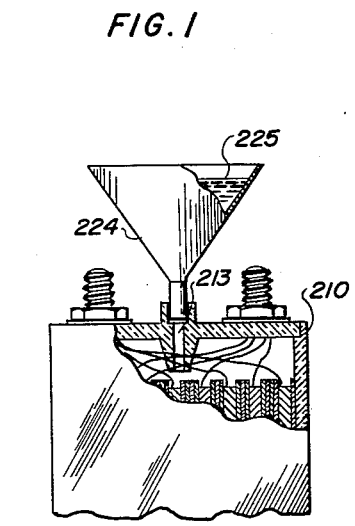
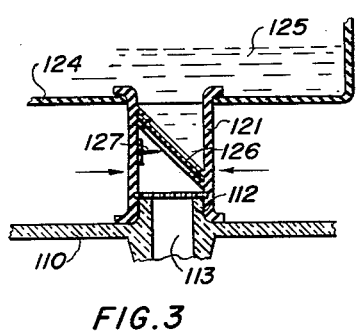

2,810,776

METHOD OF AND MEANS FOR TRANSFERRING LIQUIDS

Otto H. Brill, New York, and Frank Solomon, Jackson Heights, N. Y., assignors to Yardney International Corp., New York, N. Y., a corporation of New York Application March 1, 1955, Serial No. 491,326

13 Claims. (Cl. 136—162)

The present invention relates to a system for transferring liquids, especially strongly reactive liquids such as acids and alkalis, from one container to another, e. g. from a storage vessel to the casing of an electric battery.

The introduction of an electrolytic solution into a battery casing containing a dry electrode assembly is not without difficulties, particularly in the case of those compact assemblies of comparatively recent origin in which the electrodes with their intervening separators fit with little or no clearance into the casing so as to place the assembly under compression, due to a swelling of the separators, when the electrolyte has been added. In such instances some air is usually entrapped in pockets between adjacent electrodes and also between the electrodes and the casing; also the air originally permeating the pores or interstices of the separator material is not easily dislodged therefrom by the electrolyte, so that penetration of the electrode assembly by the liquid is slow and not always complete.

The general object of this invention is to provide a method of and means for so transferring a chemically active liquid from a first to a second container as to insure rapid and complete permeation of the latter container and its contents by the liquid.

A more specific object of this invention is to provide a method of and means for introducing an electrolyte into a battery in a manner obviating the difficulties outlined above.

Another object of this invention is to provide a method of coupling the introduction of an electrolyte solution into a battery casing with an exothermic process, thereby facilitating, to a certain degree, the activation of a battery at low ambient temperatures.

A further object of this invention is to provide a filling attachment for dry-charged electric batteries adapted to effect the virtually instantaneous activation thereof.

In accordance with the present invention, a vessel (e. g. a battery casing) to be filled with a liquid is initially filled with a gas capable of merging chemically or physically with the liquid, i. e. reacting with or being absorbed by it; next, a substantially air-tight connection is established between the gas-filled vessel and a chamber containing the liquid, the liquid being thereupon brought into contact with the gas so as to react with or otherwise absorb the liquid, the resulting vacuum in the vessel drawing the liquid into the latter and also causing it to permeate the interstices of any porous material present therein.

In the case of battery casings, which usually are provided with venting and/or filling holes at the top, it will generally be convenient to use a gas heavier than air; it will be understood, however, that a gas lighter than air will also serve if the casing is inverted during filling.

Gases suitable for purposes of the invention are characterized by high vapor pressure at ambient temperatures in addition to their ability to combine with the liquid in question. A partial list of such gases is as follows:

For alkaline solutions:

$CO_2$
$NO_2$
$SO_2$
$HCl$ (gaseous)
$HCHO$
$H_2S$ (to be avoided in the presence of silver electrodes or the like).

For acid solutions:

$NH_3$
$CH_3NH_2$
$C_2H_5NH_2$

The invention will be described more fully with reference to the accompanying drawing in which:

Fig. 1 is a somewhat diagrammatic illustration of an arrangement for filling a battery casing (shown in sectional elevation) in accordance with the invention;

Fig. 2 is a perspective view of part of a battery casing with a filling attachment embodying the invention connected to it;

Fig. 3 is a fragmentary sectional view taken on the line 3—3 of Fig. 2; and Fig. 4 is a view somewhat similar to Fig. 1 but illustrating a simplified mode of filling.

In Fig. 1 there has been shown a battery casing 10 containing the electrode assembly 11 and comprising, in addition to the usual boss 12 with vent hole 13, a nipple 14 near its top having a spring-pressed ball check 15 lodged in its channel. Positive battery terminal 16 and negative battery terminal 17 are connected, in the well-known manner, to alternate plates 18, 19 of the assembly 11 which may contain, for example, silver oxide (and/or peroxide) and zinc respectively and between which there are interposed conventional electrolyte-permeable separators 20 of, say, paper and/or regenerated cellulose.

A tube 21, containing a stopcock 22, leads from nipple 14 to a similar nipple 23 at the bottom of a vessel 24 filled with a measured quantity of electrolyte 25, e. g. concentrated (40%) potassium hydroxide. The amount of liquid originally present in vessel 24 is just sufficient to fill the casing 10 to the desired height, generally to just below the top of the separators 20, and the liquid level in vessel 24 is above the top of casing 10 for reasons that will become apparent hereinafter. The vessel 24 is open at the top to the atmosphere so that the liquid at the top is subjected to atmospheric pressure while the liquid at the bottom of the casing is subjected to a pressure greater than atmospheric pressure by reason of the hydrostatic pressure exerted by the liquid in the vessel.

In accordance with this invention, a suitable gas such as carbon dioxide is present in the casing 10 before the stopcock 22 is opened. This gas may have been introduced into the casing at the nipple 14 and, being heavier than air, will have driven out the air through the open vent hole 13 in boss 12. After the casing 10 has been completely filled with the gas, a cap 26 is placed on the boss 12 to seal the vent hole 13, the ball check 15 preventing the escape of the gas through nipple 14. At this stage the stopcock 22 is opened, as illustrated, and the level difference causes some of the liquid 25 to pass through tube 21 and nipple 14 into contact with the gas which reacts instantly and violently with this liquid, thereby initiating a chain reaction which rapidly empties the casing 10 of gas and creates a vacuum drawing the liquid 25 into the casing. After all the liquid has been introduced, air entering the casing through nipple 14 fills up the space above the electrode assembly 11 and restores atmospheric pressure within the casing 10. The nipple 14, which has been shown threaded into the casing wall, may then be removed, leaving an opening that can be sealed by any conventional method.

In Figs. 2 and 3 there has been shown a casing 110 whose vent hole 113 is connected via a short piece of deformable tubing 121 with the bottom of a collapsible storage vessel 124 containing the electrolytic solution 125. Tubing 121, engaging the boss 112 provided with vent hole 113, contains a frangible membrane 126 initially separating the liquid 125 from the gas within casing 110. A point 127 in tubing 121 is directed toward the membrane 126 so as to pierce the latter when the member 121 is squeezed as indicated by the arrows in Fig. 3. Conductors 128 complete a circuit from battery terminals 116, 117 through a nearly circular piece of resistance wire 129 imbedded in a combustible or otherwise thermally destructible top portion of vessel 124; a short tube 130, fitting inside the tubing 121, extends downwardly from the circular well portion defined by wire 129. The solution 125 will generally incompletely fill the vessel 124 as shown in Figs. 2 and 3. The vessel is held against collapse by the air pressure above the liquid which, necessarily, must be at least equal to atmospheric pressure.

When the liquid 125 is to be introduced into the gas-filled casing 110, tubing 121 is squeezed to cause a rupture of membrane 126, liquid pours through the resulting break and reacts with the gas, and the ensuing vacuum draws the entire content of vessel 124 into the casing 110, at the same time causing a collapse of this vessel and a telescoping of the tubular members 121, 130. The battery electrodes (not shown) in casing 110 are thus activated and energize, via terminals 116, 117 and conductors 128, the resistance wire 129 which burns a hole into the top of vessel 124, thereby admitting atmospheric air to casing 110 through members 121, 130. Wire 129 acts as a fuse and breaks its own energizing circuit. The attachment 121, 124 may now be removed from casing 110 and the battery is ready for use.

It will be understood that the rather elaborate arrangement of Fig. 3 enables the indefinite storage of an electrolytic solution in proximity to a dry-charged battery, ready for instantaneous activation. If such storage is not required, the attachment 121, 124 may be replaced by a simple funnel open to the atmosphere as illustrated in Fig. 4. There the casing 210, filled with a gas heavier than air such as $CO_2$, is shown with a funnel 224 removably inserted in its vent hole 213; it will be understood that for proper filling in accordance with the invention it will be necessary that the funnel 224 fit into the vent hole 213 in substantially air-tight manner and, also, that the liquid 225 be poured into the funnel with sufficient rapidity to fill immediately the neck of the funnel, thereby preventing the atmospheric air from entering the casing 210 until virtually all the liquid has been drawn into the latter.

Since the action of gas such as carbon dioxide with potassium hydroxide is highly exothermic, a certain though usually slight amount of heat will be liberated so as to assist in the activation of the battery at low ambient temperatures.

The invention is, of course, not limited to the specific embodiments described and illustrated but may be realized in a variety of adaptations and modifications without departing from the spirit and scope of the appended claims.

We claim:

1. The method of filling a battery casing with electrolyte under a pressure at least equal to atmospheric pressure, said casing having a vent hole, which comprises the steps of filling said casing with a gas heavier than air and capable of combining with said electrolyte, placing an electrolyte-containing vessel next to said casing with the electrolyte level above said vent hole, and establishing a substantially air-tight connection between said vent hole and the bottom of said vessel.

2. The method according to claim 1, wherein said vessel is initially sealed against the atmosphere and is opened toward the atmosphere only after said connection has been established.

3. The method of activating a dry-charged battery by admitting electrolyte under a pressure at least equal to atmospheric pressure into the casing of said battery which comprises the steps of replacing substantially all the air in said casing with a gas capable of combining with said electrolyte, substantially sealing said casing against the atmosphere, establishing a substantially air-tight connection between said casing and a vessel containing a quantity of said electrolyte sufficient to fill said casing to a predetermined level, and initiating the combination of said gas with said electrolyte by introducing some of said electrolyte into said casing by way of said connection, thereby creating a vacuum in said casing and causing the remainder of said electrolyte to be drawn into said casing.

4. The method according to claim 3, wherein air is admitted into said casing following the introduction of substantially all of said quantity of electrolyte into same.

5. The method according to claim 3, wherein said electrolyte is an alkaline solution and said gas is carbon dioxide.

6. In combination, a vessel containing an electrolytic liquid under a pressure at least equal to atmospheric pressure, a battery casing containing a gas capable of combining with said liquid, an electrode assembly in said casing adapted to be activated by said liquid, said casing being substantially completely sealed against the atmosphere, and conduit means forming a substantially air-tight connection between said casing and said vessel.

7. The combination according to claim 6, further comprising valve means in said conduit means for initially separating said liquid from said gas.

8. The combination according to claim 7, wherein said valve means comprises a frangible membrane and mechanism for rupturing said membrane.

9. The combination according to claim 6, wherein said gas is heavier than air, said conduit means entering said vessel substantially at its bottom and said casing substantially at its top, the level of said liquid in said vessel being above the top of said casing.

10. The combination according to claim 6, wherein said vessel is collapsible and substantially sealed against the atmosphere.

11. The combination according to claim 10, including means for opening said vessel toward the atmosphere following removal of said liquid from said vessel to said casing.

12. In combination, a battery casing, a dry-charged electrode assembly in said casing, a vessel containing an electrolytic solution adapted to activate said assembly, closure means forming an at least temporary seal between said casing and the atmosphere, conduit means connecting said vessel with said casing in substantially air-tight manner, and a gas in said casing capable of combining with said solution upon coming in contact therewith by way of said conduit means, thereby creating a vacuum in said casing adapted to draw said solution into said casing.

13. The combination according to claim 12, wherein said vessel is collapsible and sealed against the atmosphere, further comprising electrically operated means for opening said vessel to the atmosphere and electric circuit means including said electrode assembly for energizing said electrically operated means upon activation of the battery by the admission of said solution into said casing.

References Cited in the file of this patent

UNITED STATES PATENTS 2,424,807  Eckman _____ July 29, 1947

OTHER REFERENCES

"Popular Science," November 1944, page 204.
Hopkins, B. S., and Bailar, J. C., Jr.: "Essential of General Chemistry," D. C. Heath & Co., Boston, 1946, page 225.